Sept. 1, 1942.   F. D. PFENING   2,294,780
APPARATUS FOR COOLING BAKERY PRODUCTS
Filed April 15, 1939   3 Sheets-Sheet 1
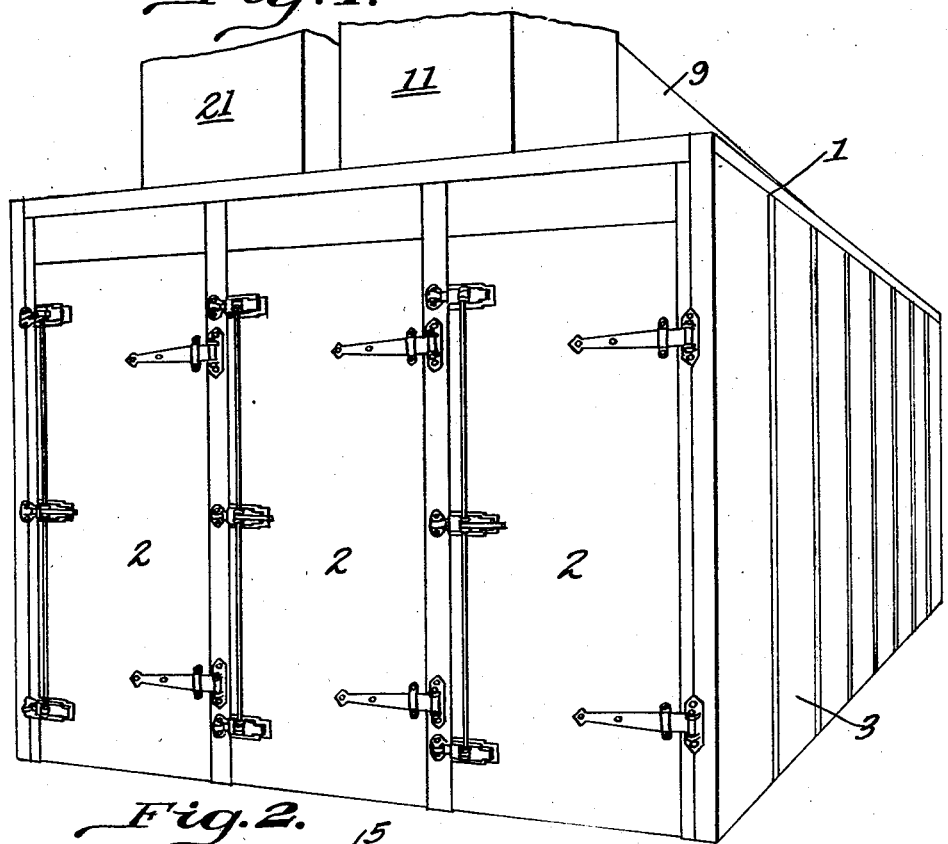
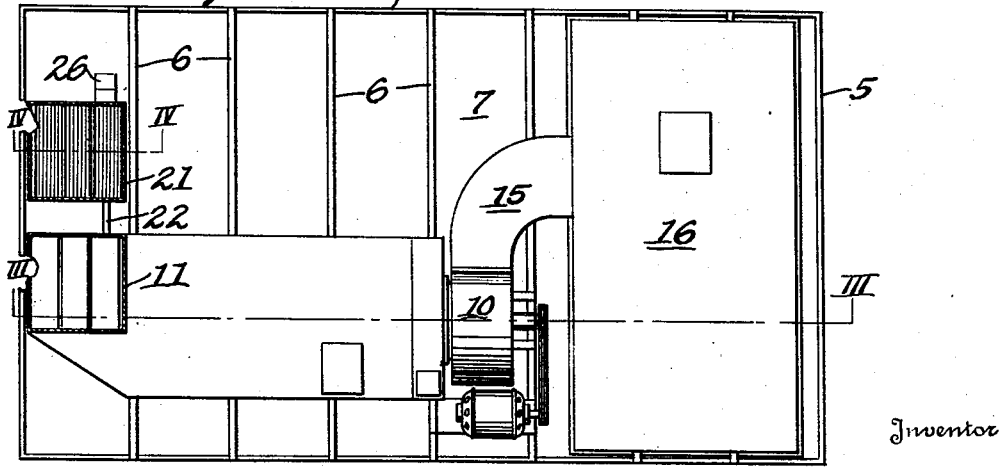
Inventor
Frederic D. Pfening
By W. S. McDowell
Attorney

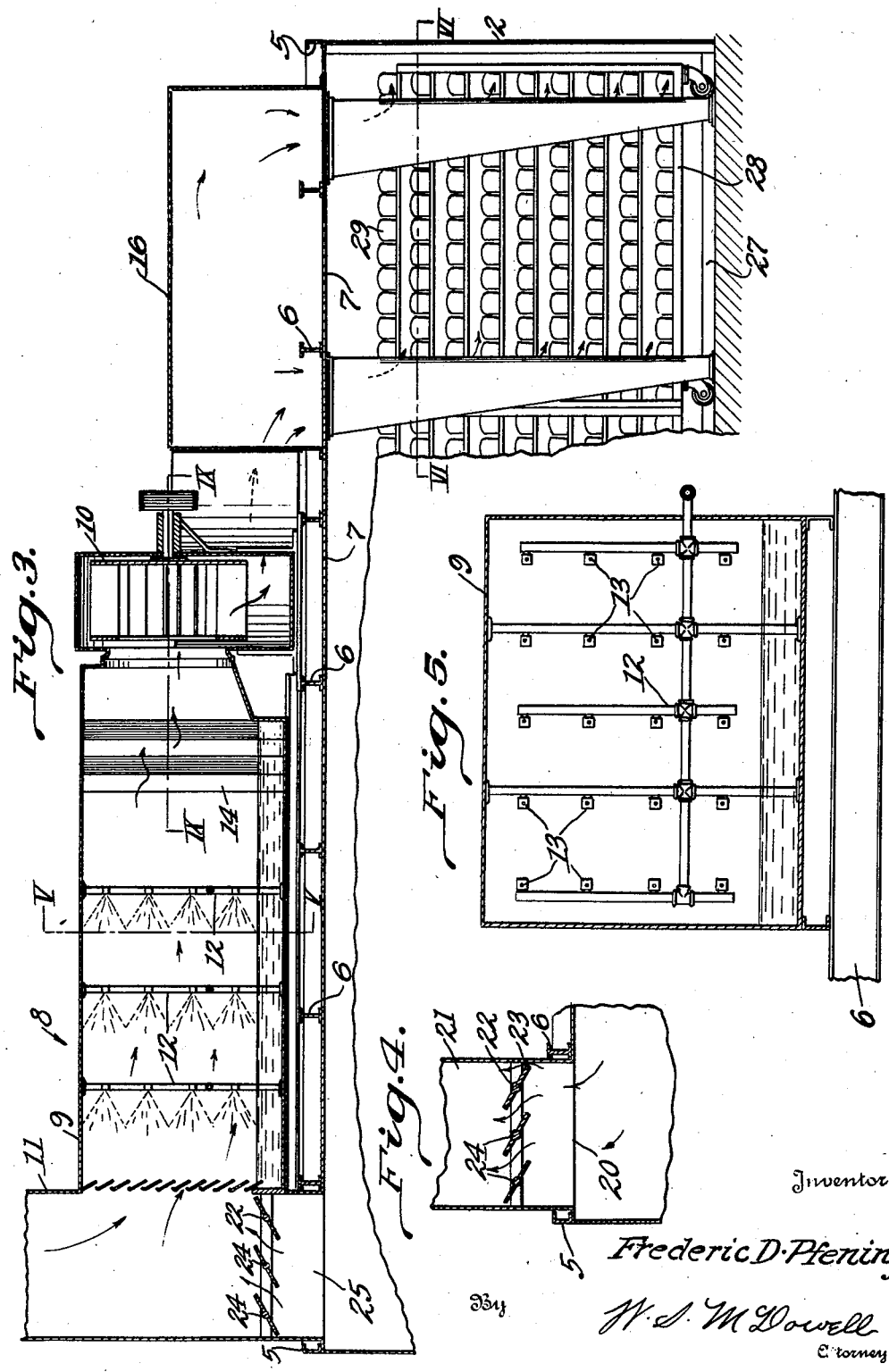

Sept. 1, 1942.　　　F. D. PFENING　　　2,294,780
APPARATUS FOR COOLING BAKERY PRODUCTS
Filed April 15, 1939　　　3 Sheets-Sheet 3
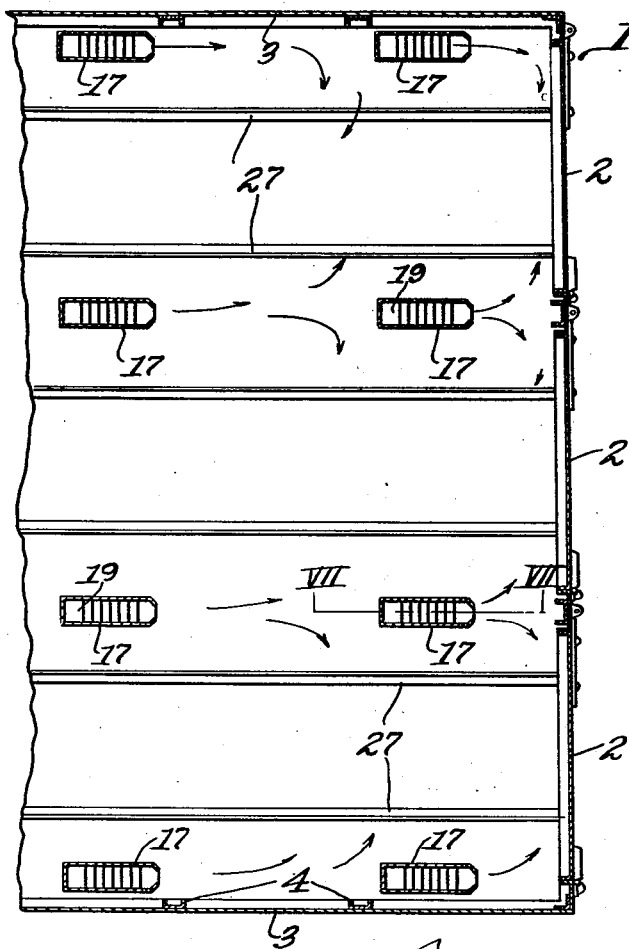
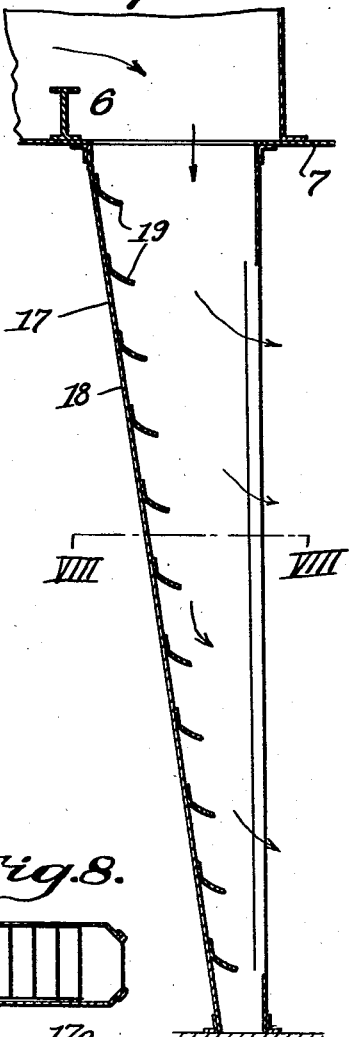
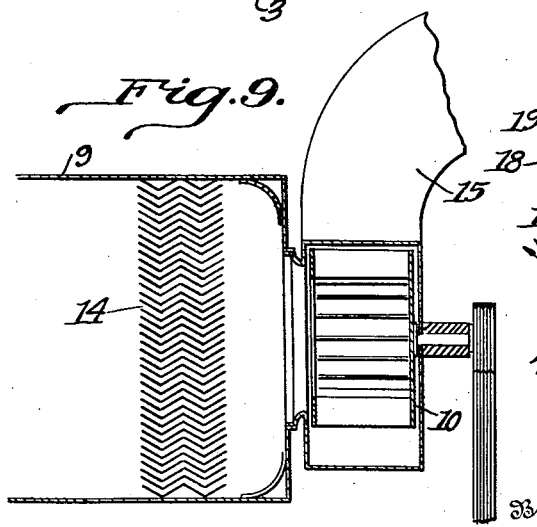
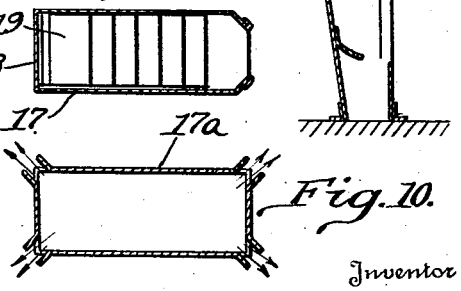
Inventor
Frederic D. Pfening
By W. S. McDowell
Attorney Patented Sept. 1, 1942

2,294,780

UNITED STATES PATENT OFFICE 2,294,780

APPARATUS FOR COOLING BAKERY PRODUCTS

Frederic D. Pfening, Columbus, Ohio

Application April 15, 1939, Serial No. 268,141

6 Claims. (Cl. 34—75)

This invention relates to mechanism employed in bakeries and is particularly directed to improved apparatus for cooling and conditioning bakery products, especially bread, after it has been removed from the oven.

Apparatus of the type now in general use is objectionable in that the bread placed therein is not uniformly cooled nor is the moisture content evenly maintained, some of the bread being relatively warm and dry when removed from the cooler while some may be cold and so damp as to be considered soggy. The latter must then be left standing in a room at atmospheric temperature until it dries out sufficiently to be wrapped. This additional drying step causes the bread to become hard and otherwise undesirable.

The primary object of the present invention resides in the provision of apparatus which will avoid the above and other objections and will consistently operate to uniformly cool the bakery products passed therethrough to the end that they will be of standard consistency, texture and weight.

Another object resides in the formation of cooling apparatus having an enclosure through which racks on which the products to be cooled may be passed, the enclosure being provided adjacent the discharge end of the enclosure with means for uniformly distributing throughout the full height of the enclosure cool air supplied by suitable air conditioning means, the air fed into the enclosure passing out therefrom through an exhaust opening disposed near the inlet or receiving end of the enclosure. By the provision of the distributing means, air having a uniform temperature and moisture content will be brought into engagement with the products regardless of their vertical location in the enclosure.

It is also an object to so form the distributors above mentioned that a uniform volume of air will issue therefrom throughout the entire height of the enclosure and to position deflector means within the distributors whereby the air will be positively caused to flow therefrom, the deflector means being capable of adjustment where it may be found necessary to have a larger volume of air directed at any particular region.

Another object resides in positioning the distributors with the outlets facing toward the discharge end of the enclosure and disposing the air exhaust opening of the enclosure adjacent the bread receiving end so that the flow of cooling medium will be in the opposite direction to the movement of the bread or other products through the cooler thus providing for their progressive cooling and the prevention of undesired checking or cracking of crusts on the bread.

Other objects will be apparent from the following description and the accompanying drawings in which a cooling apparatus formed in accordance with the present invention has been illustrated.

Fig. 1 is a perspective view looking toward the receiving end of a cooler formed in accordance with the present invention;

Fig. 2 is a plan view of the cooler shown in Fig. 1;

Fig. 3 is a vertical longitudinal sectional view taken on the plane indicated by the line III—III of Fig. 2;

Fig. 4 is a detail vertical longitudinal sectional view taken on the plane indicated by the line IV—IV of Fig. 2;

Fig. 5 is a vertical transverse sectional view taken on the plane indicated by the line V—V of Fig. 3;

Fig. 6 is a detail horizontal sectional view taken through the cooler at the discharge end, the plane of the section being indicated by the line VI—VI of Fig. 3;

Fig. 7 is a detail vertical sectional view taken on the plane indicated by the line VII—VII of Fig. 6;

Fig. 8 is a detail horizontal sectional view taken through an air distributor on the plane indicated by the line VIII—VIII of Fig. 7;

Fig. 9 is a horizontal sectional view taken on the plane indicated by the line IX—IX of Fig. 3;

Fig. 10 is a detail horizontal sectional view taken through a slightly modified form of air distributing duct.

Referring more particularly to the drawings, the numeral 1 designates the cooling apparatus in its entirety. In the present instance, the apparatus comprises an enclosure of elongated rectangular formation having receiving and discharging openings at opposite ends, these openings being closed normally by hinged doors 2. The enclosure has side walls 3 formed from sheet metal or other suitable material and reenforced by vertically extending structural members 4. At the upper ends, the side and end walls support the channel members 5 to which transversely extending I-beams 6 are connected, the latter members having a ceiling wall 7 secured to the under sides thereof. The walls and ceiling members are close fitting to prevent the escape of the cooling medium between the joints thereof.

The I-beams 6 support air conditioning mechanism designated generally by the numeral 8, which mechanism includes a casing 9 through which air to be cooled is drawn by a motor driven fan 10. The inlet to the casing 9 communicates with a stack 11 leading from the exterior of the building where the cooler is located and through which air passes to the air conditioning mechanism. At the inlet to the casing 9, there is disposed a plurality of inclined plates to prevent moisture in the casing from passing into the stack. The moisture is introduced by means of a plurality of spray heads 12 formed from pipe members having spaced nozzles 13 connected therewith. The nozzles 13 are directed toward the inlet of the casing and serve to direct sprays of water against the body of air passing through the casing. The moisture not absorbed by the air falls to the lower end of the casing where it is collected and may pass by a suitable outlet to a point of discharge. Part of the moisture directed into the air stream will evaporate and absorb heat from the air causing it to become cool.

After passing the spray heads, the air flows through a plurality of zigzag passages 14 where surplus moisture is withdrawn prior to the flow of air from the casing 9. The outlet of the casing communicates with a centrifugal type fan or blower, the outlet of the blower being connected by a curved conduit 15 with an enlarged plenum 16 provided on the enclosure over the discharge end. Within the plenum, the ceiling wall is provided with a plurality of longitudinally and transversely spaced openings to establish communication between the plenum and a plurality of air distributing ducts 17 positioned within the enclosure and extending vertically from the floor to the ceiling.

The ducts 17 are rectangular in horizontal cross section and have one wall 18 inclined to decrease the cross sectional area of the ducts from the upper to the lower ends. The ducts 17 are provided with elongated outlets in the wall opposite the inclined walls, the outlets being arranged to face the discharge end of the enclosure. By reason of the tapering formation of the ducts, due to the inclined wall, a more uniform flow of air through the outlets will be produced since the pressure on the air fed to the ducts will be maintained substantially uniform.

To provide for a positive flow of air from the ducts, the sloping wall has a plurality of directional vanes 19 secured thereon in vertically spaced order to engage and deflect the air fed to the ducts outwardly through the outlet. The vanes 19 are formed from a material such as galvanized iron which will permit the operator to manually adjust them by bending to vary the amount of air issuing through the outlet at any particular point. Ordinarily, no such adjustments will be required since it is desirable to have a uniform flow of air throughout the entire height of the enclosure.

As illustrated in Fig. 6, after the air issues from the outlets in the ducts, it will flow on a curved path and be directed toward the receiving end of the enclosure. When the air reaches this end, it will pass upwardly through an exhaust opening 20 in the ceiling to an outlet stack 21 from which it will be discharged to the exterior of the building. The stacks 11 and 21 are placed adjacent one another and a shaft 22 extends therethrough for the purpose of pivotally supporting dampers 23. The shaft 22 is connected by suitable means with additional shafts 24 also having dampers.

The ceiling wall has an opening 25 in registration with the stack 11 for a recirculation of the air in the event this step is found desirable. To provide for this recirculating operation, the shaft 22 is adjusted by a motor 26 to cause the dampers in the outlet stack 21 to close and the dampers in the inlet stack to open. A suitable thermostat, not shown, may be connected with the motor 26 to regulate its operation in accordance with the temperature of the air being fed to the air conditioning mechanism.

The floor on which the cooler is located may be provided with rails 27 to guide wheeled racks 28 through the cooler, the rails being positioned between the distributing ducts and in registration with the doors in the receiving and discharging ends of the enclosure. As illustrated in Fig. 3, the racks 28 are provided with vertically spaced shelves to receive and support the loaves of bread 29 while undergoing cooling.

The operation of the device is as follows: The bread to be cooled is placed on the racks 28 immediately after being received from the ovens. Then the racks are wheeled into the enclosure through the doorways in the receiving end. A fresh charge of racks is inserted at approximately fifteen minute intervals. While the bread is in the enclosure, air will pass into the conditioning mechanism 8 by way of the duct 11 where it will be cooled and humidified to saturation point. The fan 11 will then feed the air under superatmospheric pressures to the plenum 16 from which it will flow into the upper ends of the distributing ducts. The air will pass downwardly in the distributing ducts and be discharged through the outlet toward the front end of the cooler. Due to the fact that the outlets in the distributing ducts extend throughout the full height of the enclosure, a uniform amount of cool air will be maintained at all levels. After issuing from the distributors, the air will flow into contact with the bread to remove heat therefrom and will flow toward the rear or receiving end of the enclosure. Since the warmer bread is arranged at the receiving end, the temperature of the air will be constantly increased until it is discharged through the stack 21. By reason of the flow of air in a direction opposed to the movement of the racks, the bread will be progressively cooled and all tendency for the crust to check or crack will be eliminated.

A modified form of air distributing duct 17a may be provided as illustrated in Fig. 10. This duct has narrow outlet slots provided in the vertically extending corners, the slots extending substantially the full length of the ducts as in the preferred form.

From the foregoing, it will be apparent that cooling apparatus has been provided in which uniform temperature of the cooling medium will be attained throughout the entire height and width of the cooler. While the apparatus may be modified by the variation and rearrangement of parts, the rights to all such modifications as may be said to fall within the scope of the appended claims is hereby reserved.

I claim:

1. In apparatus for cooling bakery products of the type having an enclosure provided with receiving and discharge ends, a plenum provided on top of said enclosure adjacent the discharge end, means for cooling and feeding air at superatmospheric pressure into said plenum, and vertically extending air-distributing ducts provided in said enclosure in longitudinally and transversely spaced order, said ducts being in open communication at their upper ends with said plenum and having air outlets throughout the substantial height of said enclosure, the outlets being directed toward the discharge end of said enclosure, said enclosure having an air exhaust opening adjacent the receiving end.

2. In an apparatus for cooling bakery products of the type having an enclosure provided with receiving and discharge ends, cooling means for said enclosure comprising a plurality of transversely spaced vertically extending ducts positioned adjacent the discharge end of said enclosure, said ducts having outlet openings substantially throughout their full length, said openings facing the discharge end of said enclosure, and air conditioning means for feeding cool air under superatmospheric pressure into the upper ends of said ducts, said enclosure having an air exhaust opening adjacent its receiving end.

3. In an apparatus for cooling bakery products of the type having an enclosure provided with receiving and discharge ends, cooling means for said enclosure comprising a plurality of transversely spaced vertically extending ducts positioned adjacent the discharge end of said enclosure, the cross-sectional area of said ducts decreasing as the distance from the upper end increases, said ducts having outlet slots extending substantially the full length thereof, the slots facing the discharge end of said enclosure, and air conditioning means for feeding cool air under superatmospheric pressure into the upper ends of said ducts, said enclosure having an air exhaust opening adjacent its receiving end.

4. In an apparatus for cooling bakery products of the type having an enclosure provided with receiving and discharge ends, cooling means for said enclosure comprising a plurality of transversely spaced vertically extending ducts positioned adjacent the discharge end of said enclosure, the cross-sectional area of said ducts decreasing as the distance from the upper end increases, said ducts having outlet slots extending substantially the full length thereof, the slots facing the discharge end of said enclosure, adjustable air-deflecting vanes provided in longitudinally spaced order in said ducts, and air conditioning means for feeding cool air under superatmospheric pressure into the upper ends of said ducts, said enclosure having an air exhaust opening adjacent its receiving end.

5. Apparatus for subjecting freshly baked food products to controlled cooling conditions, comprising an elongated tunnel-like enclosure, a pair at least of parallel product-conducting ways extending longitudinally of and within said enclosure, said ways being adapted for the advancement of said products on wheeled carriers through the enclosure from its receiving to its discharging ends, a plurality of vertically extending transversely and longitudinally spaced air distributing ducts arranged within the confines of said enclosure adjacent to the side walls thereof and between said ways, said ducts being each of a height substantially approximately that of the enclosure and provided with vertically extending air-discharging slots, each of the latter being of a length approximately that of the height of the duct in which it is formed, said slots facing toward the product-discharging end of the enclosure, means for positively introducing air under predetermined conditions of temperature and relative humidity into the upper portions of said ducts and thence into said enclosure throughout virtually the full height of the latter, and an outlet for vitiated air disposed toward the product-receiving end of the tunnel, all of said ducts being arranged between said outlet and the product-discharging end of the enclosure.

6. Apparatus for subjecting freshly baked food products to controlled cooling conditions, comprising an elongated tunnel-like enclosure, a pair at least of parallel product-conducting ways extending longitudinally of and within said enclosure, said ways being adapted for the advancement of said products on wheeled carriers through the enclosure from its receiving to its discharging ends, a plurality of vertically extending transversely and longitudinally spaced air distributing ducts arranged within the confines of said enclosure adjacent to the side walls thereof and between said ways, said ducts being each of a height substantially approximately that of the enclosure and provided with vertically extending air-discharging slots, each of the latter being of a length approximately that of the height of the duct in which it is formed, said ducts being substantially rectangular in horizontal cross section, with the slots disposed in the corners thereof, means for positively introducing air under predetermined conditions of temperature and relative humidity into the upper portions of said ducts and thence into said enclosure throughout virtually the full height of the latter, and an outlet for vitiated air disposed toward the product-receiving end of the tunnel, all of said ducts being arranged between said outlet and the product-discharging end of the enclosure.

FREDERIC D. PFENING.